Nov. 7, 1933.  G. A. SUTTON  1,934,572
VALVE CORE OF THE SEALING AND POPPET TYPE
Filed June 1, 1931
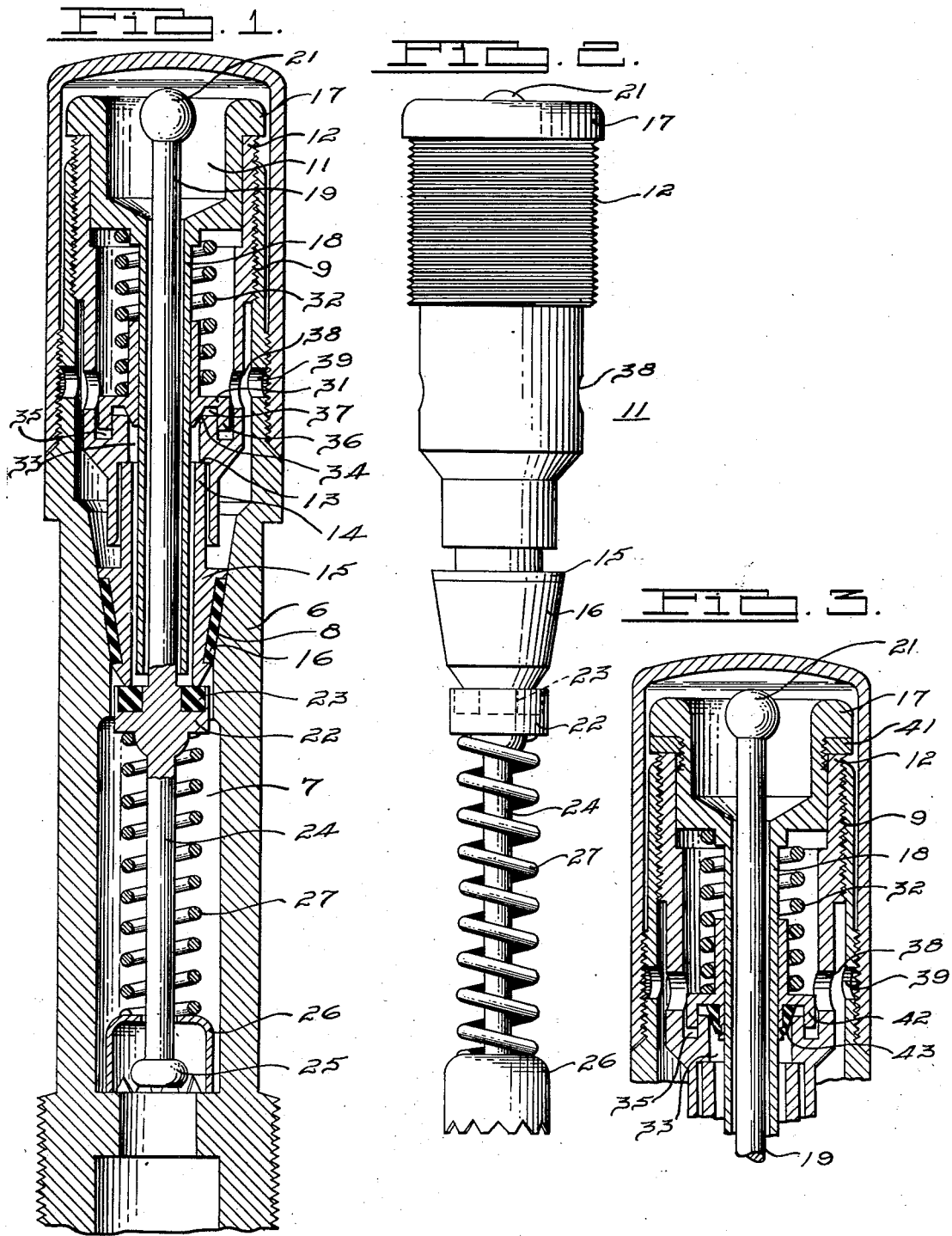
INVENTOR
George A. Sutton.
BY
Harness, Dickey, Pierce & Hann.
ATTORNEYS.

Patented Nov. 7, 1933

1,934,572

UNITED STATES PATENT OFFICE 1,934,572

VALVE CORE OF THE SEALING AND POPPET TYPE

George A. Sutton, Pontiac, Mich.

Application June 1, 1931. Serial No. 541,339

2 Claims. (Cl. 152—11.5)

My invention relates to poppet valves and particularly to a poppet valve employed in combination with a sealing valve to constitute a unit core member for a tire stem which is removable and insertable from the end thereof.

Among the objects of my invention are: to provide a core for a tire stem which is removable from the end thereof in the conventional manner and which is provided with a poppet valve which limits the amount of pressure which may be forced into a tire; to provide a poppet valve on a removable valve core which may be provided with adjustable means whereby the amount of air insertable into a tire may be varied; to construct the removable core of the above mentioned type in such manner as to have the air, which escapes when the pressure in the tire reaches a predetermined amount, produce an audible sound when passing from the exhausting vents in the core and stem, and to construct a valve core with a poppet valve of the above described type having a minimum number of parts, which is reliable in operation and economical of manufacture.

Other objects and features of novelty of my invention will be either specifically pointed out or will become apparent, when referring, for a better understanding of my invention, to the following description in conjunction with the accompanying drawing, wherein:

Figure 1 is a sectional view of a valve stem and core provided with a poppet valve which embodies features of my invention, Fig. 2 is a view, in elevation, of the core illustrated in Fig. 1, removed from the stem, Fig. 3 is a broken view of a portion of the structure illustrated in Fig. 1 showing a modified form thereof.

Poppet valves have been employed heretofore as an accessory which may be attached to the end of a valve stem and be operated in conjunction with the standard valve core which is mounted in the stem. Various attempts heretofore have been made to construct a valve core embodying both the sealing and the poppet valve, resulting in structures which were not commercially successful because the valve stems were made of two or more parts or embodied a portion of the poppet valve structure.

In practicing my invention I provide a valve core which embodies both the sealing and poppet valve and which is mountable in a valve stem from the end thereof in the same manner as a sealing valve, conventionally employed in the art, is mounted therein. I have provided a core which is simple in construction, employing a minimum number of parts to form the poppet valve which is mounted in extension of the sealing valve. The poppet valve portion of the core may be furnished in standard pressures or may be supplied with adjustable means to permit the poppet valve to be set to any pressure conforming to that of a particular tire upon which it is to be employed. A valve core so constructed is extremely economical of manufacture, costing very little more than the standard sealing valve employed today, and may be thrown away when defective and a new core substituted therefor.

In Fig. 1, I have illustrated a tire valve stem 6 having a passage 7 therein provided with a truncated conical shaped surface 8 in the medial portion thereof and a thread 9 on the inner upper surface of the passage. A valve core 11 is insertable within the passage 7 from the upper end of the stem and is provided with a threaded portion 12 on its upper end which is engageable with the thread 9 of the stem. The portion 12 of the core extends downwardly within the stem and is provided with a shoulder 13 near its lower end in engagement with an end 14 of a truncated conical member 15 which is provided with a wall 16 of rubber, or similar sealing material, for the purpose of engaging the conical surface 8 of the stem when forced thereagainst when the thread 12 is screwed within the thread 9 of the stem.

A cap 17 is pressed into fixed sealing relation with the inner surface of the threaded member 12 and is provided with a hollow tubular portion 18 which extends downwardly within the extension of the threaded member 12 and the truncated conical member 15 substantially to the lower end thereof. A rod 19 extends through the tubular portion 18 of the cap 17 and is enlarged on its upper end at 21 for preventing the rod from being forced downwardly within the tubular portion 18 of the cap. The medial portion of the rod is enlarged to form a valve 22 which is provided with a sealing member 23 of rubber or similar material which engages the lower end of the truncated conical member 15 for sealing the ends thereof against the passage of air into its hollow interior. A rod 24 extends downwardly from the valve 22 in axial alignment with the rods 19 and is provided with an enlarged end 25 which supports a washer or inverted cup shaped member 26 between which a spring 27 is provided which extends upwardly into engagement with the valve 22 for biasing the valve into sealing relation with the member 15.

The sealing structure so far described is similar to the sealing valve conventionally employed in the art, the downward movement of the end of the stem 19 forces the valve 22 out of sealing relation with the member 15 to permit air to pass through the stem into the tire until such time as the supply conductor is removed from the stem when the bias of the spring 27 forces the valve upwardly into sealing relation with the member 15.

The core is provided with a second valve 31 which is biased downwardly by a spring 32 into sealing relation with the extended portion of the threaded member 12. The inner portion of the member 12, above that provided with the shoulder 13, is provided with a cylindrical opening 33 which is engaged by the conical side 34 of the valve 31. An annular slot 35 is provided in the portion 33 of the threaded member 12, for receiving an annular downwardly extending flange 36, provided on the valve 31. A chamber 37 is in this manner formed on the under surface of the valve 31 which is normally sealed through the engagement of the conical side 34 with the edge of the portion 33, from communication with the air in the stem or that being conducted thereto. The engagement of the flange 36 with the inner surface of the slot 35 precisely centers the valve relative to the portion 33 and by providing the conical surface 34 the valve is accurately wedged relative to the portion 33 by the bias of the spring 32.

The wedging of the conical surface 34 with the edge of its seat, completely seals the passage therethrough and provides cooperating sealing surfaces which compensate for any wear therebetween to retain the passage sealed against the escape of air.

When an inflating air nipple is attached to the end of the stem 6, a portion thereof, contacting with the end of the rod 19, forces the valve 22 downwardly against the bias of the spring 27 to permit air to pass within the tubular portion 18 of the cap 17 and to flow through the passage 7 into the tire. Air also passes upwardly over the outer surface of the tubular portion 18 within the hollow interior of the sealing member 15 in engagement with the lower end of the valve 31.

As the pressure within the tire increases the pressure on the valve 31 likewise increases until a predetermined pressure is reached at which the valve 31 is moved slightly upward against the bias of the spring 32 to permit air to flow within the chamber 37. An increased area of the valve 31, is then subjected to the pressure of the air, resulting in the valve being forced to unseated or completely opened position. The air will then escape through the openings 38 in the threaded member 12 and the openings 39 in the stem 6 to effect a hissing or whistling sound which apprizes the operator that the desired pressure obtains within the tire. The inflating nipple is then removed, permitting the valve 22 to seal and retain the air within the tire and to cut off the air pressure from the valve 31 which is immediately closed under the influence of the spring 32.

In Fig. 3, I have shown a modified form of valve 31 wherein the body portion 42 is provided with a sealing portion 43 of rubber, fibre, or like material, which engages the valve seat and seals the passage therethrough against a flow of air. It is to be understood that the entire valve 31 may be constructed of rubber or like material, in which case a metal sleeve may be provided centrally of the valve for engaging the tubular portion 18 of the cap.

As pointed out hereinabove, I prefer to calibrate the springs and to furnish valve cores which operate at different pressures over a range sufficient to meet the various pressures employed in existing tires today. However, it is within the purview of my invention, as illustrated in the modified form of structure illustrated in Fig. 3, to employ adjusting means whereby the valve core may be calibrated to have the poppet valve open when subjected to a predetermined air pressure. In the structure illustrated in the figure a threaded ring 41 is provided under the shoulder of the cap member 17 which may have flat surfaces or holes engageable by a wrench or spanner to effect the adjustment of the ring on the surface of the cap member 17 to move it longitudinally of the threaded member 12. Suitable indicia may be provided on the ring 41 and the cap member 17 for indexing the pressure at which the valve 31 will open when the cap portion 17 is moved upwardly relative to the threaded portion 12 through the adjustment of the ring. When this construction is employed only one form of valve need be constructed which can be adjusted by an operator to meet the particular requirements relative to the air pressure of his particular tires.

While I have described and illustrated several embodiments of my invention, it will be apparent to those skilled in the art that various changes, omissions, additions and substitutions may be made therein without departing from the spirit and scope of my invention, as set forth in the accompanying claims.

I claim:

1. A valve core having a threaded top portion which engages a threaded top portion of a valve stem when the valve core is disposed therewithin through the threaded top end of the stem, a sealing element on said core engageable with the inner wall of said stem, a sealing valve engageable with said element for sealing the stem against an outward flow of fluid, and a poppet valve on said core within the stem for controlling the pressure of fluid insertable through said sealing valve.

2. A valve core having a threaded top portion which engages a threaded top portion of a valve stem when the valve core is disposed therewithin through the threaded top end of the stem, a sealing element on said core engageable with the inner wall of said stem, a sealing valve engageable with said element for sealing the stem against an outward flow of fluid, a poppet valve on said core within the stem for controlling the pressure of fluid insertable through said sealing valve, and a rod extending through said poppet valve in engagement with said sealing valve by which said sealing valve is actuated.

GEORGE A. SUTTON.